United States Patent
Ohba (10) Patent No.: US 7,620,206 B2
(45) Date of Patent: *Nov. 17, 2009

(54) IMAGE PROCESSING DEVICE AND METHOD, AND DISTRIBUTION MEDIUM

(75) Inventor: Akio Ohba, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/652,901

(22) Filed: Jan. 12, 2007

(65) Prior Publication Data

US 2007/0110279 A1    May 17, 2007

Related U.S. Application Data

(63) Continuation of application No. 10/723,874, filed on Nov. 26, 2003, now Pat. No. 7,200,247, which is a continuation of application No. 09/315,082, filed on May 19, 1999, now Pat. No. 6,714,660.

(30) Foreign Application Priority Data

May 19, 1998    (JP)    ............... P10-136239

(51) Int. Cl.
    *G06K 9/00*    (2006.01)
(52) U.S. Cl. .................. 382/103; 382/190; 382/274; 348/169; 345/204; 345/629
(58) Field of Classification Search ......... 382/103, 382/144, 117, 118, 162, 165, 173, 181, 190, 382/199, 240, 284, 260, 294, 283, 274, 214; 348/14, 16, 169, 588, 36, 87; 345/428, 31, 345/592, 630, 204, 629
See application file for complete search history.

(56) References Cited

U.S. PATENT DOCUMENTS

| 4,539,585 | A |   | 9/1985 | Spackova et al. |
| 4,912,770 | A |   | 3/1990 | Seto et al. |
| 5,148,477 | A | * | 9/1992 | Neely et al. .................. 382/107 |

(Continued)

FOREIGN PATENT DOCUMENTS

EP    0 725 364    8/1996

(Continued)

OTHER PUBLICATIONS

Stiefelhagen et al. Real-Time Lip-Tracking for Lipreading. 5$^{th}$ European Conference on Speech Communication and Technology. Sep. 1997, XP-001049257, pp. 2007-2010.

(Continued)

*Primary Examiner*—Sheela C Chawan
(74) *Attorney, Agent, or Firm*—Katten Muchin Rosenman LLP (57) ABSTRACT

To make it possible to accurately track a prescribed part a low-resolution overall image is taken in from an input image, and a medium-resolution image, whose center is the head part, is extracted from it. When it is possible to extract a medium-resolution image in the middle of which is the head part, an even higher-resolution image is extracted, in the middle of which is the two-eyes part.

4 Claims, 12 Drawing Sheets

U.S. PATENT DOCUMENTS

| | | | |
|---|---|---|---|
| 5,280,530 | A | 1/1994 | Trew et al. |
| 5,291,560 | A | 3/1994 | Daugman |
| 5,293,255 | A | 3/1994 | Nishizawa et al. |
| 5,293,427 | A | 3/1994 | Ueno et al. |
| 5,307,452 | A | 4/1994 | Hahn et al. |
| 5,751,836 | A | 5/1998 | Wildes et al. |
| 5,892,837 | A | 4/1999 | Luo et al. |
| 5,905,807 | A | 5/1999 | Kado et al. |
| 6,046,745 | A | 4/2000 | Moriya et al. |
| 6,075,905 | A | 6/2000 | Herman et al. |
| 6,181,806 | B1 | 1/2001 | Kado et al. |
| 6,400,374 | B2 | 6/2002 | Lanier |
| 6,714,660 | B1 | 3/2004 | Ohba |
| 2004/0240740 | A1* | 12/2004 | Ohba ......................... 382/190 |

FOREIGN PATENT DOCUMENTS

| | | |
|---|---|---|
| EP | 0 735 510 | 10/1996 |
| JP | 4-205070 | 7/1992 |
| JP | 04-328689 | 11/1992 |
| JP | 5-174149 | 7/1993 |
| JP | 5-336445 | 12/1993 |
| JP | 7-49949 | 2/1995 |
| JP | 7-255044 | 10/1995 |
| JP | 8-241414 | 9/1996 |
| JP | 9-134418 | 5/1997 |
| JP | 9-146743 | 6/1997 |
| JP | 9-160575 | 6/1997 |
| JP | 9-331509 | 12/1997 |
| JP | 10-011609 | 1/1998 |
| JP | 10-27140 | 1/1998 |
| JP | 4117682 | 7/2008 |
| WO | WO 99/57900 | 11/1999 |

OTHER PUBLICATIONS

Tang et al. Automatic Construction of 3D Human Face Models Based on 2D Images. Proceedings of the International Conference on Image Processing (ICIP) XP-000704073, Sep. 16, 1996, pp. 467-470.

Notice of Reasons for Rejection dated Sep. 4, 2007, from the corresponding Japanese Application.

Ryohei Nakatsu "Toward the Creation of a New Media for the Information Network" Technical Report of IEICE, Jan. 24, 1997, vol. 96, No. 496, pp. 67-74.

Hiroyuki Sakamoto, et al. "Application of Feeling Communication for CyberOffice" Study Report of Information Processing Society, Jan. 29, 1998, vol. 98, No. 8, pp. 225-230.

Tomonori Kobayashi, et al. "Construction of Real-Time Interaction System to Comprehend Emotion" Proceedings of the IEICE General Conference, Mar. 30, 1998, p. 388.

Notification of Reason(s) for Rejection with translation, dated Jul. 22, 2008, for corresponding Japanese Patent Application JP 2000-550063.

James L. Crowley, et al., "Multi-Modal Tracking of Faces for Video Communications", Jun. 17, 1997, p. 640-645, Proceeding of the 1997 IEEE Computer Society Conference on Computer Vision and Pattern Recognition, US.

Tatsuo Yotsukura, et al., Generation of the Life-Like Agent in Cyberspace using Media Conversion, Feb. 20, 1998, p. 75-82, vol. 22, Technical Report of ITE, the Institute of Image Information and Television Engineers.

Tatsuo Yotsukura, et al. Generation of Life-Like Agent in CyberSpace using Media Coversion, Feb. 20, 1998, p. 75-82, vol. 97, Technical Report of IEICE, the Institute of Electronics Information and Communication Engineers.

European Office Action dated Nov. 25, 2008, from the corresponding European Application.

Notification of Reasons for Rejection with translation, dated Oct. 21, 2008, from the corresponding Japanese Patent Application 2000-550063.

Notice of Reasons for Rejection dated Jul. 6, 2009, for corresponding Japanese Application 2008-241811.

* cited by examiner

IMAGE PROCESSING DEVICE AND METHOD, AND DISTRIBUTION MEDIUM

CROSS REFERENCE TO RELATED APPLICATIONS

The present application is a continuation application of and claims priority under 35 U.S.C. § 120 from U.S. patent application Ser. No. 10/723,874 filed Nov. 26, 2003 now U.S. Pat. No. 7,200,247, which is a continuation of U.S. patent application Ser. No. 09/315,082 filed May 19, 1999, now U.S. Pat. No. 6,714,660, and claims priority from Japanese Patent Application No. P10-136239 filed May 19, 1998, the contents of which are herein incorporated by reference.

FIELD OF THE INVENTION

This invention relates to an image processing device and method, and distribution medium. More specifically, it relates to an image processing device and method, and distribution medium, in which changes in a prescribed image can be continuously extracted and tracked.

BACKGROUND OF THE INVENTION

The recent proliferation of computer entertainment devices has made it possible to enjoy games in every home. In these computer entertainment devices, the game objects (characters) are usually made to move in arbitrary directions and at arbitrary speeds by users who manipulate buttons or joysticks.

Thus a conventional device is made so that various commands are input by manipulating buttons or joysticks. This amounts to nothing more than mirroring button and joystick manipulation techniques in the game. The problem has been that it is impossible to enjoy games that have more abundant changes.

The present invention, which was devised with this situation in mind, is intended to make it possible to enjoy games that have more abundant changes.

The image processing device has a first extraction means that extracts the image of a prescribed part from an input image; a second extraction means that extracts a part of the prescribed part extracted by the first extraction means as a higher-resolution image; and a tracking means that tracks the image of the prescribed part so that the second extraction means can continuously extract the image of the prescribed part from the image extracted by the first extraction means.

The image processing method also includes a first extraction step that extracts the image of a prescribed part from an input image; a second extraction step that extracts a part of the prescribed part extracted in the first extraction step as a higher-resolution image; and a tracking step that tracks the image of the prescribed part so that in the second extraction step the image of the prescribed part can be continuously extracted from the image extracted in the first extraction step.

The distribution medium provides a program that causes processing to be executed on an image processing device and includes a first extraction step that extracts the image of a prescribed part from an input image; a second extraction step that extracts a part of the prescribed part extracted in the first extraction step as a higher-resolution image; and a tracking step that tracks the image of the prescribed part so that in the second extraction step the image of the prescribed part can be continuously extracted from the image extracted in the first extraction step.

A higher-resolution image is extracted so that the image of the prescribed part can be continuously tracked from the input image.

BRIEF DESCRIPTION OF THE INVENTION

The image processing device has a first extraction means (for example, step S32 in FIG. 4) that extracts from an input image the image of a prescribed part; a second extraction means (for example, step S35 in FIG. 4) that extracts as a higher-resolution image a part of the prescribed part extracted by the first extraction means; and a tracking means (for example, step S36 in FIG. 4) that tracks the image of the prescribed part so that the second extraction means can continuously extract the image of the prescribed part from the image extracted by the first extraction means.

The image processing device further has a display control means (for example, step S2 in FIG. 3) that causes the input image to be displayed as an image whose left and right are reversed.

The image processing device also has a display control means (for example, step S9 in FIG. 3) that causes to be displayed a prescribed image that is different from the input image, and causes this image to be changed in correspondence with the image extracted by the second extraction means.

Figure 1:
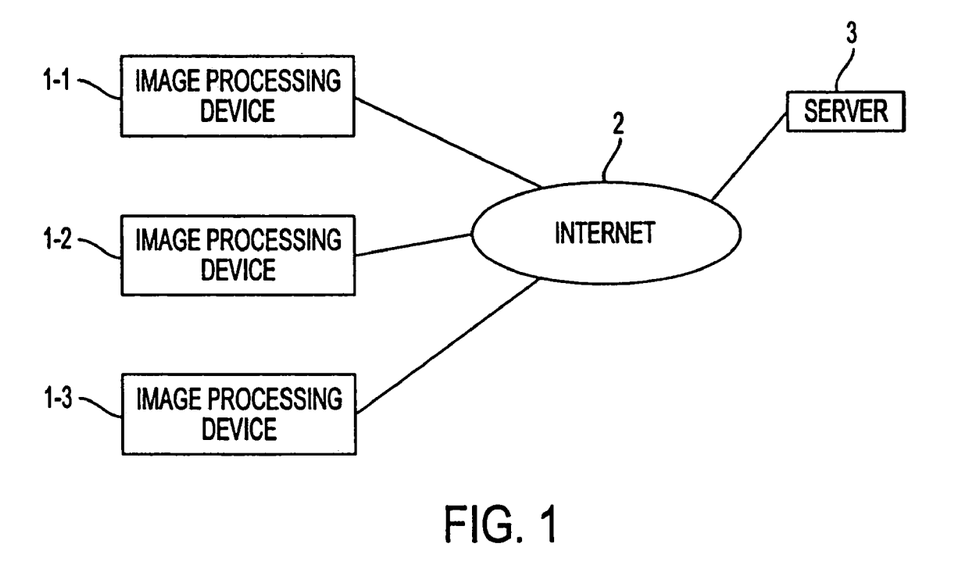
FIG. 1 is a block diagram showing an example of the composition of an image processing system to which this invention is applied.

FIG. 1 is a block diagram showing an example of the composition of an image processing system to which this invention is applied. As shown in this diagram, image processing devices 1-1 through 1-3 are connected to server 3 via Internet 2. Image processing devices 1-1 through 1-3 (referred to hereafter simply as image processing device 1, unless it is necessary to distinguish them individually; likewise for the other devices as well) send to server 3 via Internet 2 the current position of the mask image of the user in his own virtual reality space as well as data including the expression of the user mask image. Server 3 supplies to each image processing device 1, via Internet 2, image data on the mask images of users positioned near the position, in virtual reality space, that is supplied from it.

Figure 2:
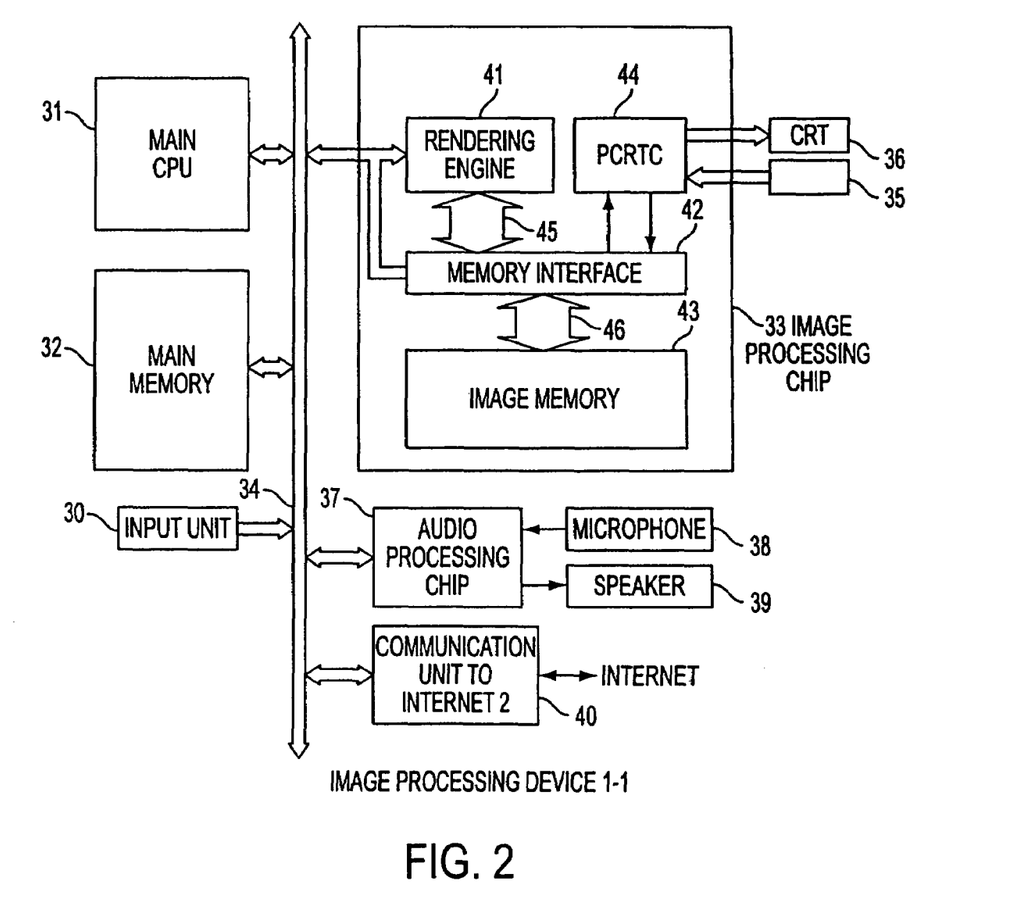
FIG. 2 is a block diagram showing an example of the composition of the image processing device of FIG. 1.

FIG. 2 is a block diagram showing an example of the composition of image processing device 1-1. Although not pictured, image processing devices 1-2 and 1-3 have a same composition as image processing device 1-1.

Connected to main CPU 31 via bus 34 are main memory 32 and image processing chip 33. Main CPU 31 generates drawing commands and controls the operation of image processing chip 33. Stored in main memory 32 as appropriate are the programs and data needed for main CPU 31 to execute various processing.

In response to drawing commands supplied from CPU 31, rendering engine 41 of image processing chip 33 executes operations that draw the prescribed image data to image memory 43 via memory interface 42. Bus 45 is connected between memory interface 42 and rendering engine 41, and bus 46 is connected between memory interface 42 and image memory 43. Bus 46 has a bit width of, for example, 128 bits, and rendering engine 41 can execute drawing processing at high speed to image memory 43. Rendering engine 41 has the capacity to draw image data of 320×240 pixels, of the NTSC system or PAL system, for example, or image data of 640× 480 pixels in real time (1/30 to 1/60 second).

Image processing chip 33 has programmable CRT controller (PCRTC) 44, and this PCRTC 44 has the function of controlling in real time the position, size, and resolution of the image data input from video camera 35. PCRTC 44 writes the image data input from video camera 35 into the texture area of image memory 43 via memory interface 42. Also, PCRTC 44 reads via memory interface 42 the image data drawn in the drawing area of image memory 43, and outputs it to and displays it on CRT 36. Image memory 43 has a unified memory structure that allows the texture area and drawing area to be specified in the same area.

Audio processing chip 37 processes the audio data input from microphone 38 and outputs it from communication unit 40 through Internet 2 to the other image processing device 1. Also, via communication unit 40, audio processing chip 37 processes the audio data supplied from the other image processing device 1 and outputs it to speaker 39. Communication unit 40 exchanges data between the other image processing device 1 and server 3 via Internet 2. Input unit 30 is operated when the user inputs various commands.

According to the mode set by the blending mode setting function Set-Mode (MODE) from CPU 31, rendering engine 41 causes blending processing to be done between destination pixel value DF(X,Y) in the drawing area of image memory 43 and texture area pixel value SP(X,Y).

The blending modes executed by rendering engine 41 include mode 0 through mode 3, and in each mode the following blending is executed.

| | |
|---|---|
| SP(XY) | Mode 0: |
| DP(X,Y)+SP(X,Y) | Mode 1: |
| DP(X,Y)−SP(X,Y) | Mode 2: |
| $(1-\alpha_{sp}(X,Y))*DP(X,Y)+\alpha_{sp}(X,Y)*SP(X,Y)$ | Mode 3: |

Here $\alpha_{sp}(X,Y)$ represents the α value of the source pixel value.

That is, in mode 0, the source pixel value is drawn to the destination without modification; in mode 1, the source pixel value is added to the destination pixel value and is drawn; and in mode 2, the source pixel value is subtracted from the destination pixel value and is drawn. And in mode 3, the source pixel value and destination pixel value are composed by assigning a weighting that corresponds to the α value of the source.

The image data drawn to the drawing area of image memory 43 is read out in PCRTC 44 via memory interface 42, and from there it is output to and displayed on CRT 36.

Next, the operation is described with reference to the flowchart in FIG. 3. First, in step S1, active image acquisition processing is executed. The details of part of this active image acquisition processing are shown in the flowchart in FIG. 4.

Figure 5:
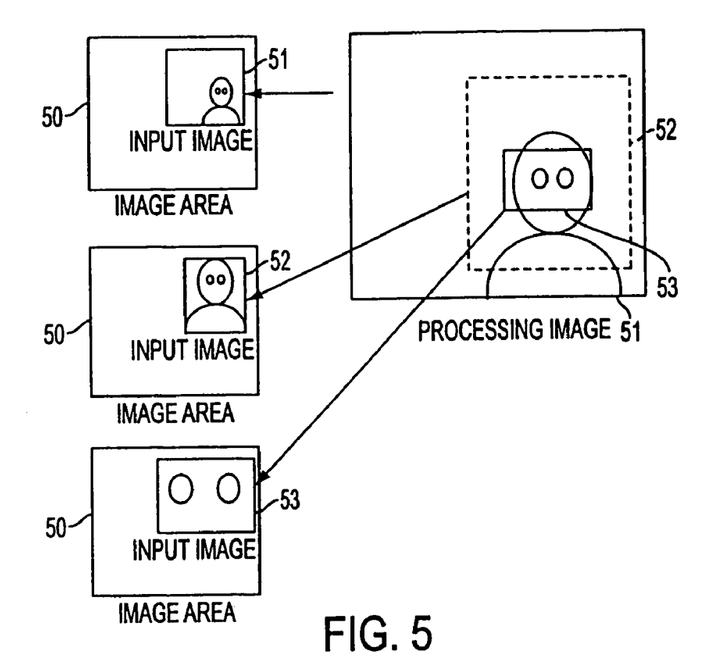
FIG. 5 is a diagram that explains the active image acquisition processing of FIG. 4.

That is, first, in step S31, PCRTC 44 takes in low-resolution image data of the entire screen from the image input from video camera 35 and supplies it to and stores it in image memory 43 via memory interface 42. In this way, processing image 51 is stored in image area 50 of image memory 43, as shown in FIG. 5.

Next, proceeding to step S32, main CPU 31 controls PCRTC 44 and executes processing that extracts the head part of the viewed object (user) from the image input in step S31. That is, as shown in FIG. 5, the image 52 of the head part is extracted from processing image 51. In step S33, main CPU decides whether the head part can be extracted from the image taken in step S31, and if it cannot, it returns to step S31 and repeatedly executes the processing that begins there.

If in step S33 it is decided that the head part can be extracted, it proceeds to step S34, and main CPU 31 controls PCRTC 44 and takes in at medium resolution the region whose center is the head part extracted in step S32. That is, as shown in FIG. 5, medium-resolution image 52 whose center is the head part is taken in from low-resolution processing image 51 taken in step S31, and is stored in the image area of image memory 43.

Next, in step S35, main CPU 31 executes processing that extracts the image of the two-eyes part from the medium-resolution image whose center is the head part that was taken in step S34. That is, it executes processing in which the two-eyes part is extracted from medium-resolution image 52 whose center is the head part in FIG. 5. In step S36, it is decided whether the two-eyes part can be extracted, and if it cannot be extracted, it returns to step S31, and the processing that begins there is repeatedly executed.

If in step S36 it is decided that the two-eyes part can be extracted, main CPU 31 controls PCRTC 44, it proceeds to step S37, and processing is executed that takes in at high resolution the region whose center is the two-eyes part. That is, high-resolution image 53 whose center is the two-eyes part is taken in from medium-resolution image 52 whose center is the head part shown in FIG. 5, and is stored in image area 50.

Next, in step S38, main CPU 31 executes processing in which the two-eyes part from high-resolution image 53 taken in step S37 is extracted and its position is calculated. In step S39, it is decided whether the two-eyes part can be extracted, and if it cannot, it returns to step S34, and the processing that begins there is repeatedly executed. If in step S39 it is decided that the two-eyes part can be extracted, it returns to step S37, and the processing that begins there is repeatedly executed.

As described above, the prescribed part is extracted with a higher-resolution image, and if the prescribed part cannot be extracted, it returns to a lower-resolution processing step and the processing that begins there is repeatedly executed; thus even if the user moves relative to video camera 35, his two-eyes part is automatically and surely tracked and can be taken in as an image.

Figure 3:
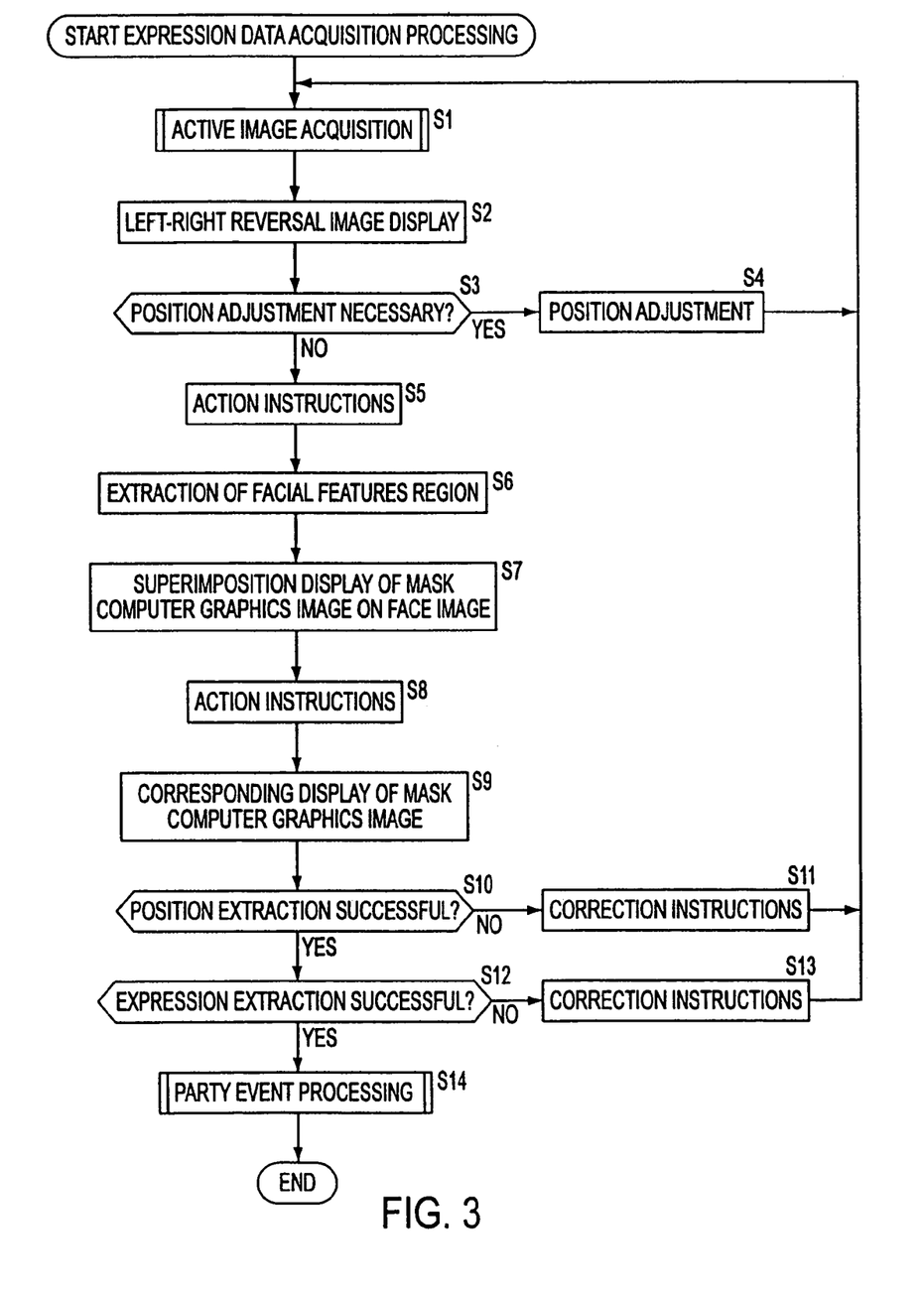
FIG. 3 is a flowchart that explains the expression data acquisition processing of the image processing device of FIG. 2.
Figure 4:
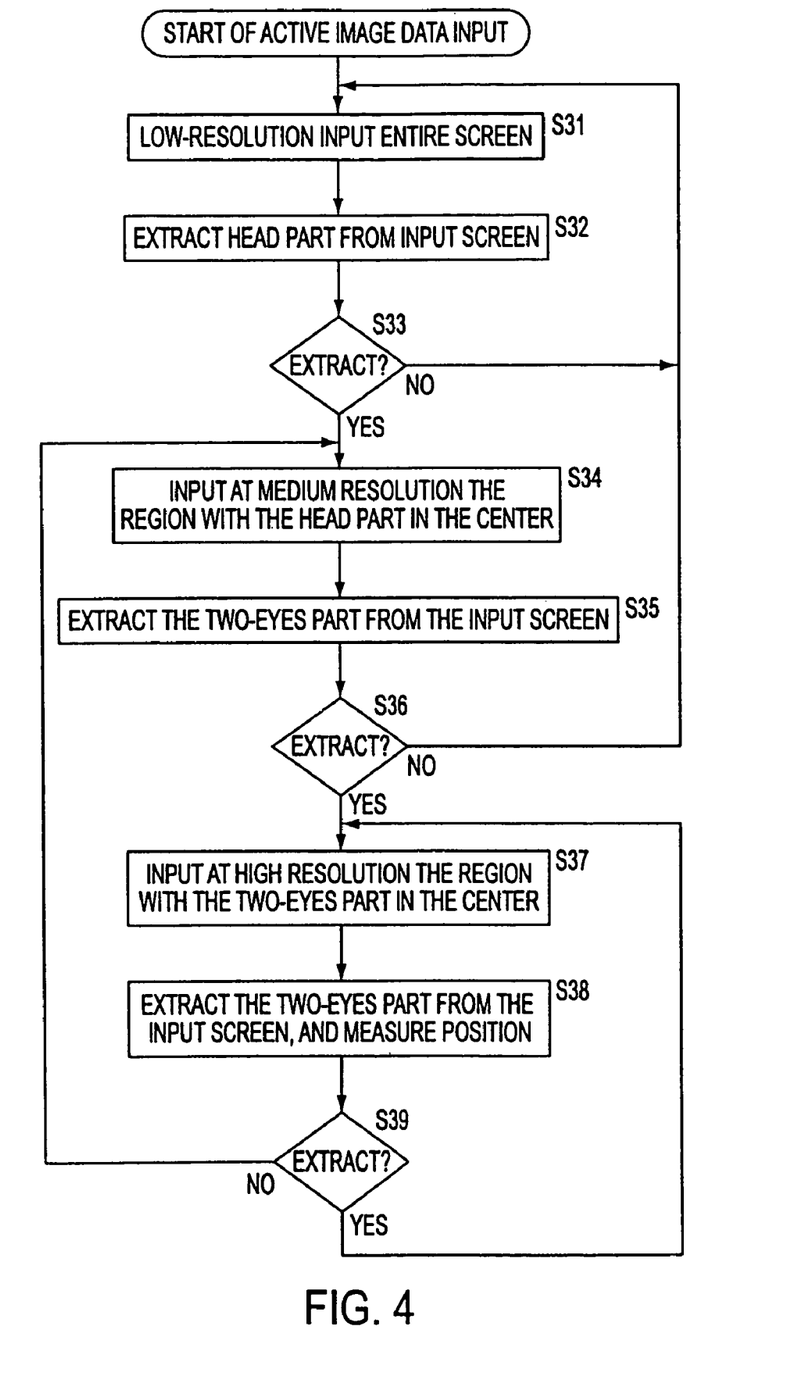
FIG. 4 is a flowchart that explains the active image acquisition processing in step S1 of FIG. 3.
Figure 6:
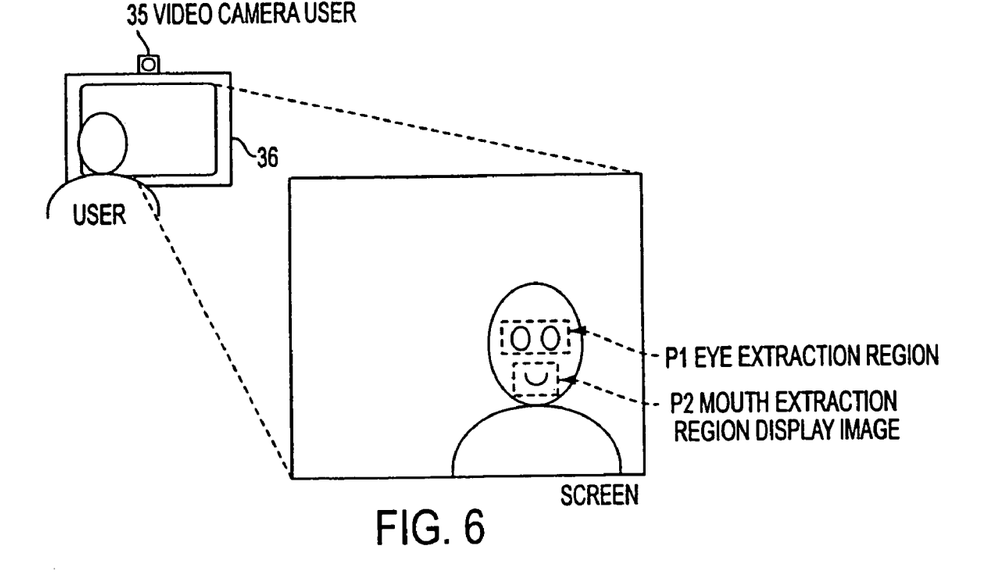
FIG. 6 is a diagram that shows an example of the display in step S2 in FIG. 3.
Figure 7:
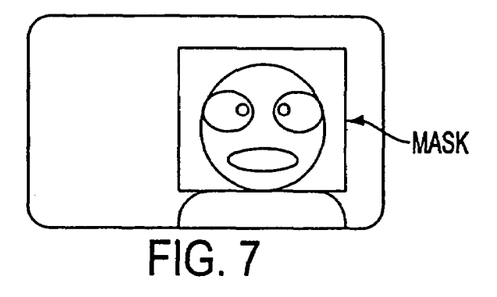
FIG. 7 is a diagram that shows an example of the display in step S7 in FIG. 3.

In step S1 of FIG. 3, processing as above is executed that includes the processing shown in FIG. 4, the two-eyes part of the viewed object is automatically tracked, and if an image of the viewed object (an image of the face) is obtained, then in step S2, main CPU 31 controls rendering engine 41, generates a left-right reverse image, and outputs it to and displays it on CRT 36. That is, in response to commands from main CPU 31, rendering engine 41 converts the image of the user's face that was taken in step S1 to an image in which its left and right are reversed (to its mirror image). This image in which left and right are reversed is output via PCRTC 44 to CRT 36 and is displayed as shown in FIG. 6. At this time, as shown in FIG. 6, main CPU 31 controls rendering engine 41, and displays line P1 superimposed on the two-eyes extracted region extracted in steps S35, S37, and S38, allowing the user to be recognized.

If in steps S35, S37, and S38 extraction is done for the mouth as well, then line P2 is displayed around the extracted region of the mouth, as shown in FIG. 6.

If lines P1 and P2 are displayed in this way, then the user will be able to extract the regions enclosed by these lines P1 and P2 and recognize that tracking operations are being carried out.

Next, proceeding to step S3, the user looks at the display image of CRT 36 and decides whether it is necessary to make a positional adjustment of his own position relative to the position of video camera 35; if it is decided that it is necessary to make a positional adjustment, it proceeds to step S4, and the position of video camera 35 or the position of the user himself is appropriately adjusted. Then it returns to step S1, and the processing that begins there is repeatedly executed.

If in step S3 it is decided that there is no need to adjust the position of video camera 35 or of the user himself, it proceeds to step S5, and main CPU 31 issues action instructions for extracting the features of the face. That is, main CPU 31 controls audio processing chip 37 and gives the user, through speaker 39, instructions to perform prescribed actions, such as to turn his head, blink (wink), or open and close his mouth. Of course, these instructions may also be given by controlling rendering engine 41, drawing prescribed messages in image memory 43, and outputting these drawn messages to, and displaying them on, CRT 36 via PCRTC 44.

Next, proceeding to step S6, main CPU 31 extracts, as changes in the image, the changes of the operations performed by the user in response to the action instructions in step S5, and extracts the facial-features region. That is, after, for example, an instruction to blink (wink) is given, the part in which a change occurs in the taken-in image is recognized as an eye. And after an instruction is given to open and close the mouth, the region of the image in which the change occurs is recognized as the mouth part.

Next, proceeding to step S7, main CPU 31 generates a computer graphics image of a mask and controls rendering engine 41 to draw it superimposed on the display position of the image of the user's face. When this image is output to CRT 36 via PCRTC 44, an image is displayed on CRT 36 in which the face part of the user's image is replaced by a mask.

Next, proceeding to step S8, main CPU 31 outputs from speaker 39 or CRT 36 a message instructing the user to move the facial-features region extracted in step S6 (for example, the eyes, mouth, or eyebrows). That is, the user is asked, for example, to wink, open and close his mouth, or move his eyebrows up and down. When the user winks, opens and closes his mouth, or moves his eyebrows up and down in response to this request, the image thereof is taken in via video camera 35. In step S9, main CPU 31 detects the region that changes in response to the action instruction as the change of the region that corresponds to the instruction, and in response to the detection results, it changes the corresponding part of the mask displayed in step S7. That is, when the user blinks (winks) in response to an action instruction to blink (wink) and this is detected, main CPU 31 causes the eyes of the mask to blink (wink). Similarly, when the user opens and closes his mouth or moves his eyebrows up and down, the mouth of the mask is opened and closed and the eyebrows of the mask are moved up and down correspondingly.

Figure 8:
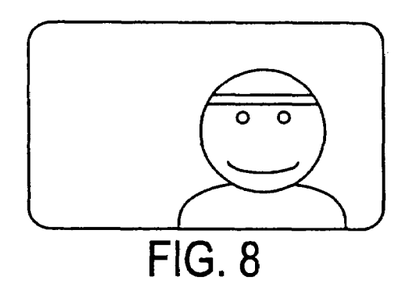
FIG. 8 is a diagram that explains an example of the processing in step S11 in FIG. 3.

Next, in step S10, the user decides whether the position has been extracted correctly. If, for example, the eye of the mask does not wink even though the user winked in response to a wink action instruction, the user, by operating the prescribed key on input unit 30, informs main CPU 31 that the correct extraction has not been carried out. Then, in step S11, main CPU 31 outputs a correction instruction. That is, the user is instructed to remain stationary, and a message is output to remove something moving in the background that is thought to be the cause of the misjudgment, or to change the lighting, etc. If there is anything behind the user that is moving, in response to this message the user removes it, or modifies the lighting. In addition, main CPU 31 gives instructions to put on a headband as shown in FIG. 8, or to put on a cap. When the user puts on a headband or cap in accordance with this instruction, this can be taken as the standard to detect the head part. Thus in this case it returns to step S1, and the processing that begins there is repeatedly executed.

Figure 9:
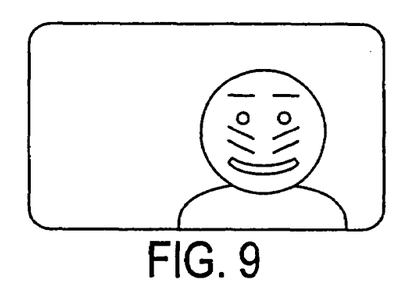
FIG. 9 is a diagram that explains an example of the processing in step S13 in FIG. 3.

If in step S10 it is decided that the position has been extracted correctly, it proceeds to step S12, and it is decided whether the expression has been extracted correctly. That is, if for example, even though the user moves his cheek in response to an action instruction in step S8, the cheek of the mask displayed in step S9 does not change, then by operating input unit 30 the user informs main CPU 31 that the expression extraction processing has not been successful. Then main CPU 31 outputs a correction instruction in step S13. For example, main CPU 31 instructs the user to put makeup on or mark the cheek part. If in response to this instruction the user puts makeup on or marks his cheeks, an image as shown in FIG. 9 will be taken in, so main CPU 31 will be able to correctly extract the cheeks by taking this makeup or marking as a standard. Thus even in this case it returns from step S13 to S1, and the processing that begins there is repeatedly executed.

Figure 10:
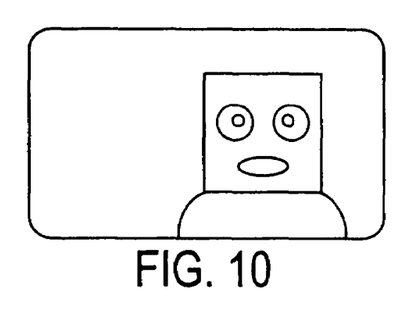
FIG. 10 is a diagram that explains an example of the processing in step S14 in FIG. 3.
Figure 11:
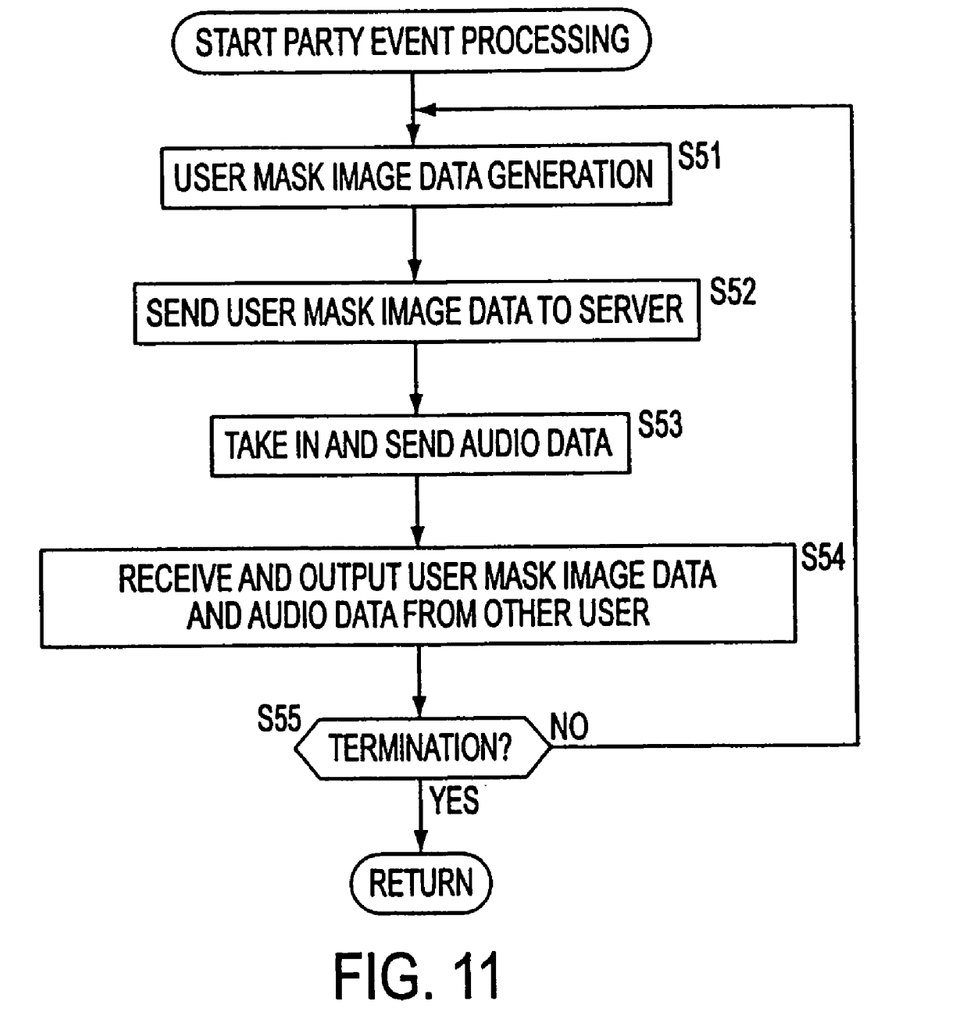
FIG. 11 is a flowchart that explains the party event processing in step S14 in FIG. 3.

If in step S12 it is judged that the expression can be extracted correctly, an image of the user is obtained that has a mask whose expression changes in response to changes in the user's face, as shown in FIG. 10. In this case, it proceeds to step S14, and party event processing is executed. The details of this party event processing are shown in FIG. 11.

First, in step S51, main CPU 31 generates the user's image, which has the mask generated in step S9, as the image of the virtual image of the user in virtual reality space, controls rendering engine 41, and draws it to image memory 43. Next, in step S52, main CPU 31 reads the image data of the user's virtual image from image memory 43 and supplies it to communication unit 40. Then main CPU 31 further controls communication unit 40 and transmits this image data to server 3 via Internet 2. At this time, main CPU 31 simultaneously also sends the position data corresponding to the position of the user mask image in the virtual reality space provided by server 3, in response to operations from input unit 30.

Then in step S53, main CPU 31 controls audio processing chip 37 and causes user audio data input from microphone 38 to be transmitted from communication unit 40 through Internet 2 to server 3.

When image data of the corresponding user mask image, position data in the virtual reality space, and audio data are input via Internet 2, for example from image processing device 1-1, server 3 supplies this data to the image processing device 1 (for example image processing device 1-2 and image processing device 1-3) positioned near its position and for which the user mask image corresponds. Similarly, when the user mask image data, position data, and audio data is transferred via Internet 2 from image processing devices 1-2 and 1-3, server 3 outputs this data to image processing device 1-1 via Internet 2.

When thus the user mask image data, its position data, and audio data are transferred from the other image processing devices 1-2 and 1-3, main CPU 31 of image processing device 1-1 receives this in step S54. And main CPU 31 controls rendering engine 41 and draws to image memory 43 the image of the corresponding user mask image in the corresponding position on the image in virtual reality space. Then this drawn image data is read by PCRTC 44 and is output to and displayed on CRT 36. Also, main CPU 31 outputs the transmitted audio data to audio processing chip 37, causes audio processing to be done on it, then causes it to be output from speaker 39.

Figure 12:
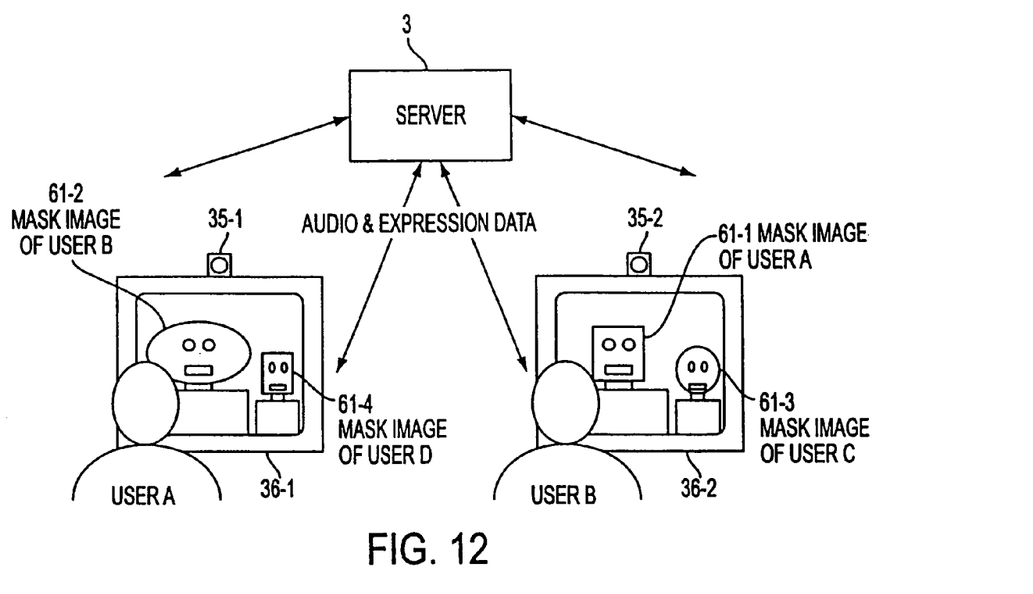
FIG. 12 is a diagram that explains party event processing.

As described above, for example as shown in FIG. 12, the user mask images 61-2 and 61-4 of other users (in the display example of FIG. 12, users B and D) are displayed on CRT 36-1 of image processing device 1-1, which is used by user A. And appearing on CRT 36-2 of image processing device 1-2 of user B are user mask image 61-1 of user A and user mask image 61-3 of user C. When user A talks, this is taken in by microphone 38 and is played for example from speaker 39 of image processing device 1-2 of user B. And because at this time the image of user A is taken in by video camera 35-1, the mouth of user mask image 61-1 of user A changes corresponding to the mouth of user A. Similarly, when user B changes his facial expression, this is taken in by his video camera 35-2, and the facial expressions of user virtual image 61-2 of user B change.

The above-described processing is repeatedly executed until a termination instruction is given in step S55.

Figure 13:
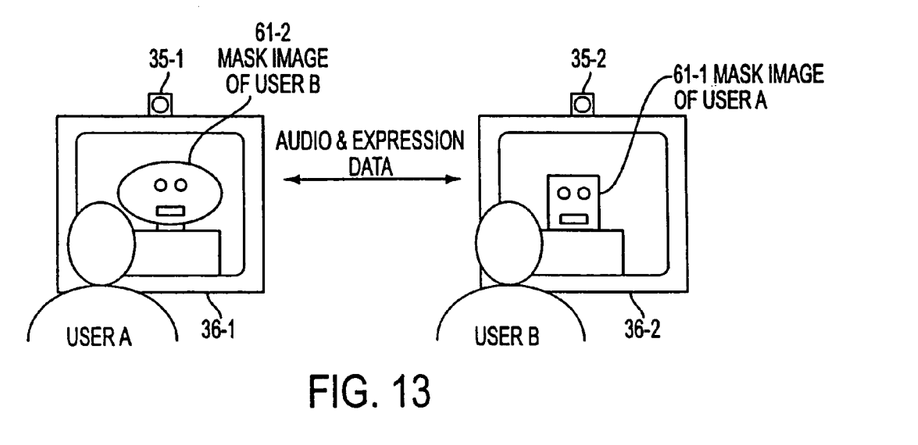
FIG. 13 is a diagram that explains another example of party event processing.

In the above, a virtual party is enjoyed in a virtual reality space with the mask images of many users via server 3, but it is also possible to enjoy a one-on-one virtual party between user A and user B, as shown in FIG. 13.

If the head part is extracted in the processing in step 32 of FIG. 4, it is possible to extract the head part by taking as the standard, for example, the color of the hair. In this case, pyramid filter processing can be employed. When pyramid filter processing is done, the average value of the pixel values is calculated, so the region in which this average value is close to the pixel value of the color of hair can be extracted as the hair region.

Figure 14:
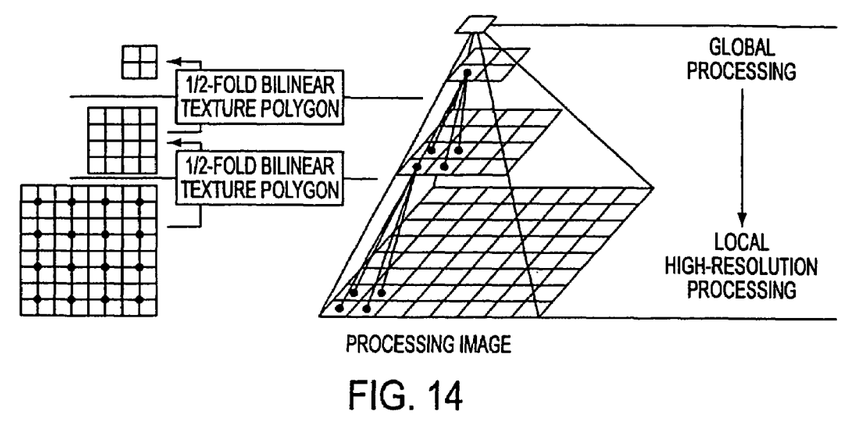
FIG. 14 is a diagram that explains pyramid filter processing.

Next, we explain pyramid filter processing. In this pyramid filter processing, as shown in FIG. 14, processing is repeated in which one determines the average value of four mutually adjacent pixel values of the processing image, and arranges the pixel in the center of the four pixels. That is, when processing is executed in which the average pixel value of four nearby points is calculated by bilinear interpolation, image data of (n/2)×(n/2) is obtained from a processing image of n×n (where n is a power of 2). When this processing is executed repeatedly, ultimately the data of the one pixel at the apex of the pyramid becomes pixel data that represents the average value of all the pixels at the base of the pyramid.

If such pyramid processing is to be done, main CPU 31 outputs the following drawing commands to rendering engine 41.

```
int L;/* length of a side of the source area */
int offset;
L=2N^; /* length of one side of the initial image */
offset=0;
while (L>1){
    Set_Texture_Base(0,offset);/* set basepoint of texture area */
    offset += L;
    Set_Drawing_Base(0,offset);/*set basepoint of drawing area */
    Flat_Texture_Rectangle(0,0,L/2,0,L/2,L/2,0,L/2,0.5,0.5,L+0.5,
    0.5,L+0.5,L+0.5,0.5,L+0.5,1.0):
    L=L/2;
}
```

Figure 15:
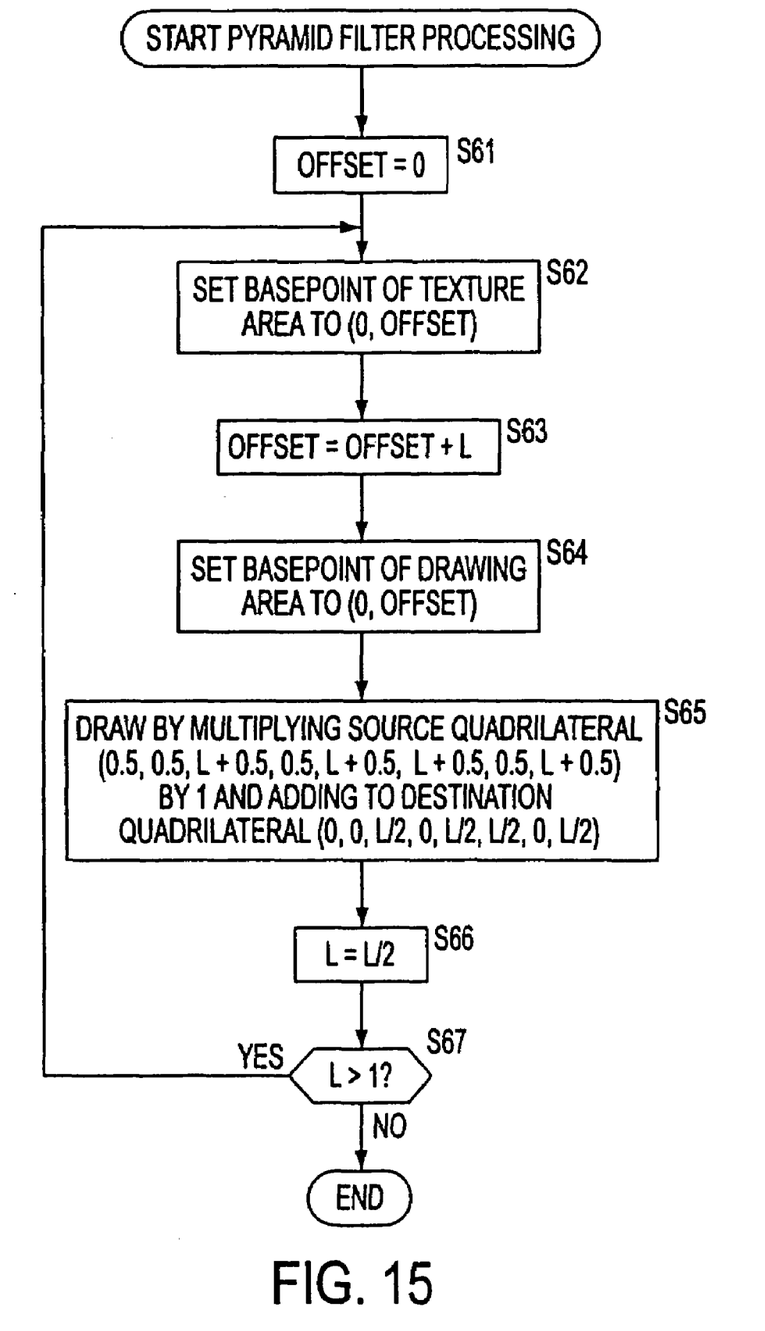
FIG. 15 is a flowchart that explains pyramid filter processing.
Figure 16:
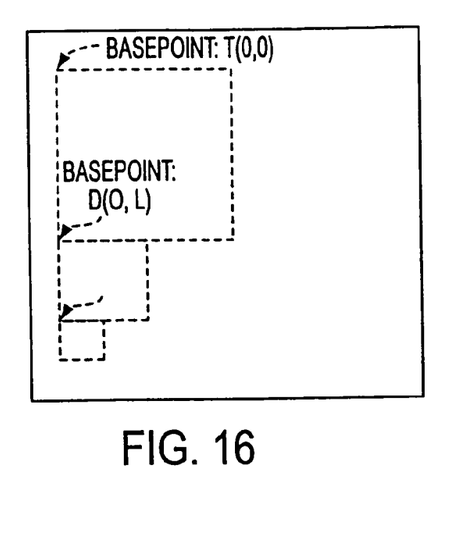
FIG. 16 is a diagram that explains the processing of steps S62 and S64 in FIG. 15.

When these drawing commands are expressed in flowchart form, we get what is shown in FIG. 15. First, in step S61, the variable "offset" is initialized to 0. Next, in step S62, processing is executed in which the basepoint of texture area 51 is set to (0,offset). That is, as shown in FIG. 16, basepoint T(0,0) is set. Next, proceeding to step S63, the variable "offset" is incremented by L. Then, in step S64, (0,offset) is set to the basepoint of drawing area 52 [sic; S64 actually says the opposite: "set basepoint of drawing area to (0,offset)"]. In this case, as shown in FIG. 16, basepoint D(0,L) is set.

Next, in step S65, processing is executed in which drawing is done by multiplying the pixel values of quadrilateral (0.5, 0.5,L+0.5,0.5,L+0.5,L+0.5,0.5,L+0.5) of the source (texture area) by 1 and a quadrilateral (0,0,L/2,0,L/2,L/2,0,L/2) of the destination. That is, in this way one obtains from the lower-most processing image (on the base of the pyramid) shown in FIG. 14 the processing image of one layer higher.

Next, proceeding to step S66, the variable L is set to ½ its current value. In step S67, it is decided whether variable L is greater than 1; if variable L is greater than 1, it returns to step S62, and the processing that begins there is repeatedly executed. That is, in this way, the image data of the third layer is obtained from the second layer.

Thereafter, similar processing is repeatedly executed, and if in step S67 it is decided that variable L is not greater than 1 (if it is decided that variable L is equal to 1), the pyramid filter processing terminates.

If the facial-features region is extracted in step S6 in response to action instructions in step S5 of FIG. 3, the region that changes in response to the action instructions (the moving part) can be extracted by performing inter-frame difference processing.

Figure 17:
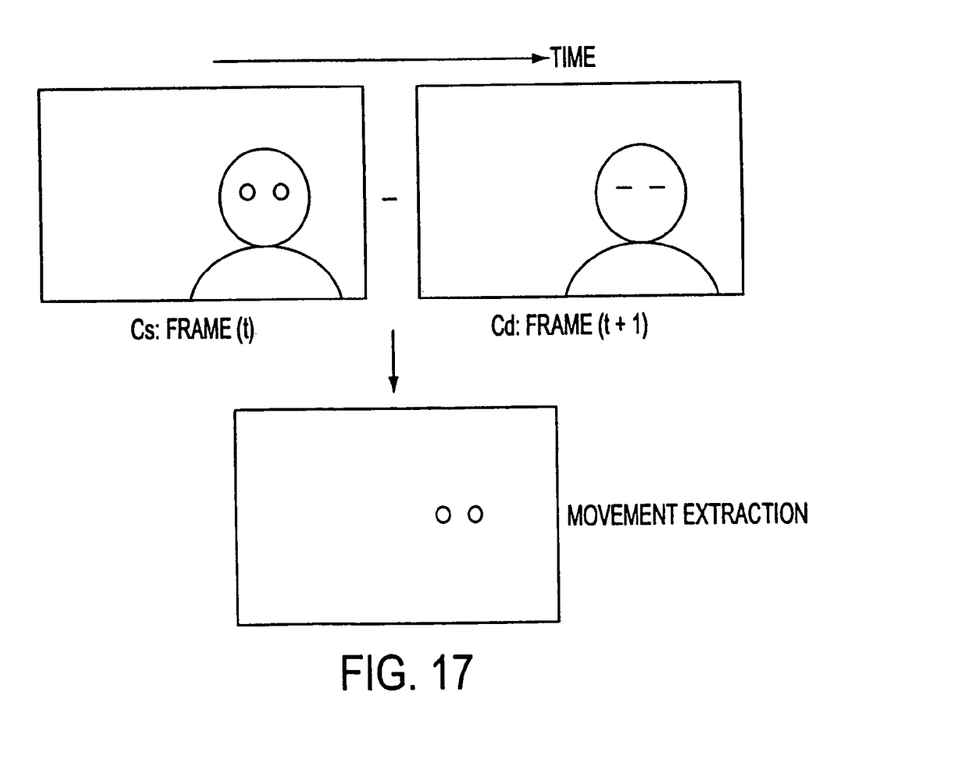
FIG. 17 is a diagram that explains inter-frame difference processing.

Next, we explain inter-frame difference processing. In this inter-frame difference processing, the difference between the image of a frame at time t and the image of the frame at time t+1 is calculated as shown in FIG. 17. In this way, the area of an image in which there is movement can be extracted.

Figure 18:
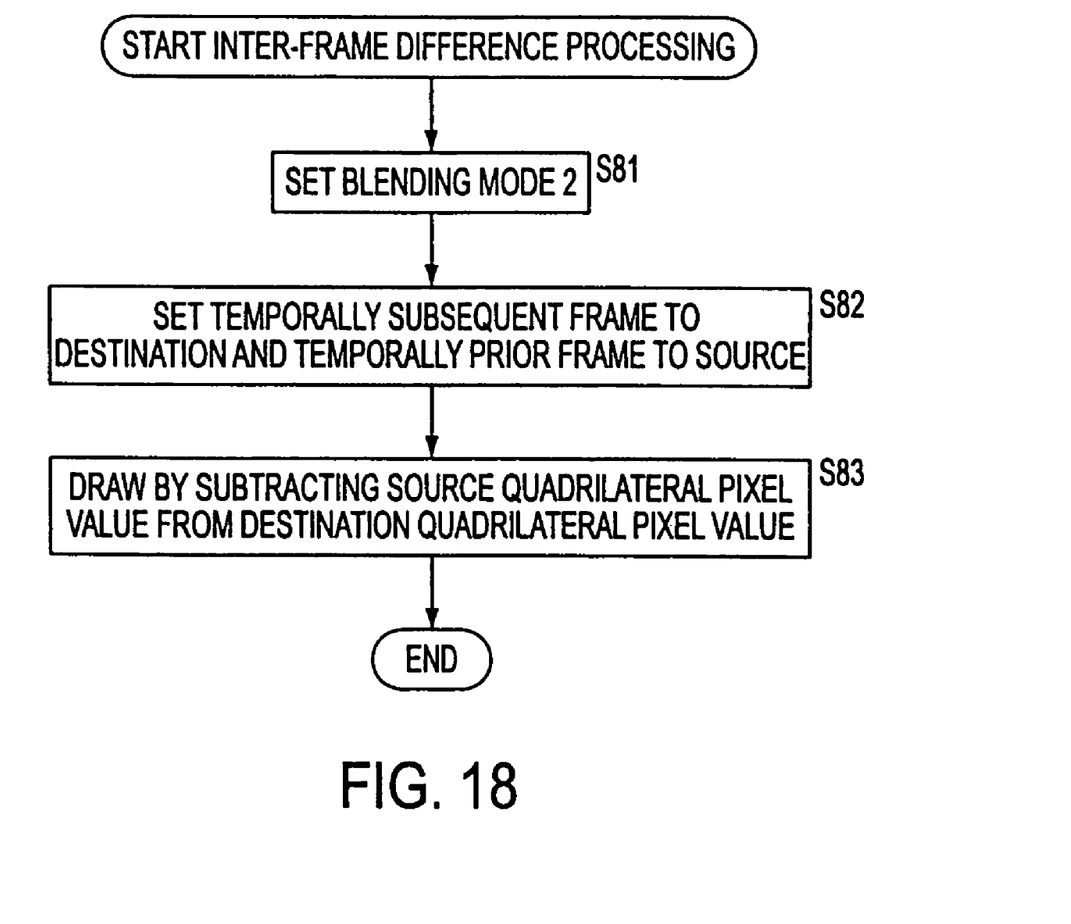
FIG. 18 is a flowchart that explains inter-frame difference processing.

That is, in this case, main CPU 31 causes rendering engine 41 to execute processing as shown in the flowchart in FIG. 18. First, in step S81, rendering engine 41, in response to instructions from main CPU 31, sets mode 2 as blending mode. Next, in step S82, among the image data input from video camera 35, rendering engine 41 takes the image data of a temporally later frame as a destination image and takes the image data of a temporally previous frame as source image data. Then, in step 83, rendering engine 41 executes processing in which drawing is done by subtracting the pixel value of the source quadrilateral from the pixel value of the destination quadrilateral. The pixel data of a frame in the destination area and the image data of a frame in the source area have essentially an equal value in the still-picture region. As a result, when the processing in step S83 is executed, the value of the image data is roughly zero.

By contrast, the value of the image data in a region where there is movement is different depending on whether it is in the destination or in the source. Therefore the value of the image data obtained as a result of the processing in step S83 becomes a value that has a prescribed size other than zero. Thus one can distinguish whether it is a moving region or a still region from the size of the value of each pixel data of the image data of the inter-frame difference.

In this specification, "system" means the whole of a device that consists of multiple devices.

As the distribution medium for providing the user with a computer program that performs the above-described processing, one can employ either a recording medium such as magnetic disk, CD-ROM, or solid memory, or a communication medium such as network or satellite.

As described above, with the image processing device, the image processing method, and the distribution medium of the present invention, an image once extracted is extracted as an even higher-resolution image, making it possible to accurately track a prescribed part.

What is claimed is:

1. An image processing method performed by a computer comprising the steps of:
   (a) extracting by the computer a prescribed part of a user from an image of the user;
   (b) generating by the computer a CG image of a mask and superimposing and drawing the CG image of the mask on the image of the user;
   (c) instructing by the computer the user to move the image of the prescribed part of the user; and
   (d) displaying by the computer changes of the part of the CG image of the mask that corresponds to the prescribed part of the image of the user, so that the user can determine whether the prescribed part of the user has been extracted correctly.

2. The image processing method of claim 1, wherein the step (d) where the user determines whether the prescribed part of the user has been extracted correctly is followed by a step of returning the processing to the step (a) when the correct extraction of the user has not been carried out.

3. A computer program stored on a computer readable medium and executable by a computer for processing an image performing the steps of:
   (a) extracting a prescribed part of a user from an image of the user;
   (b) generating a CG image of a mask and superimposing and drawing the CG image of the mask on the image of the user;
   (c) instructing the user to move the image of the prescribed part of the user; and
   (d) displaying changes of the part of the CG image of the mask that corresponds to the prescribed part of the image of the user, so that the user can determine whether the prescribed part of the user has been extracted correctly.

4. The computer program of claim 3, wherein the step (d) where the user determines whether the prescribed part of the user has been extracted correctly is followed by a step of returning the processing to the step (a) when the correct extraction of the user has not been carried out.

* * * * *